United States Patent [19]

Gruhl

[11] 3,927,305
[45] Dec. 16, 1975

[54] FUEL ECONOMY INDICATOR HAVING RANGE SELECTED FILTERS

[75] Inventor: Frederick Gruhl, Almont, Mich.

[73] Assignee: General Motors Corporation, Detroit, Mich.

[22] Filed: Mar. 3, 1975

[21] Appl. No.: 554,742

[52] U.S. Cl............. 235/150.21; 73/114; 235/61 J; 235/92 CP; 235/152
[51] Int. Cl.² ....................................... G01M 15/00
[58] Field of Search.......... 235/150.21, 61 J, 92 CP, 235/92 MT, 92 FL, 152; 73/113, 114

[56] References Cited
UNITED STATES PATENTS

| | | | |
|---|---|---|---|
| 2,282,438 | 5/1942 | Thompson | 235/150.21 |
| 3,549,868 | 12/1970 | Watson et al. | 235/150.21 |
| 3,793,882 | 2/1974 | Holben | 235/150.21 |

FOREIGN PATENTS OR APPLICATIONS

| | | | |
|---|---|---|---|
| 1,817,046 | 8/1969 | Germany | 235/150.21 |

Primary Examiner—Malcolm A. Morrison
Assistant Examiner—Errol A. Krass
Attorney, Agent, or Firm—Howard N. Conkey

[57] ABSTRACT

A fuel economy indicator having a fuel economy calculator responsive to vehicle fuel consumption and vehicle speed for generating a signal representing the instantaneous vehicle fuel economy. This signal is coupled to inputs of three filters each having a time constant associated with a respective one of three consecutive ranges of vehicle fuel economy. A range detector responsive to the signal representing the instantaneous fuel economy cooperates with a filter selector to couple the output of the filter having the time constant associated with the fuel economy range embracing the instantaneous fuel economy calculation to an indicator for providing an indication of vehicle fuel economy.

2 Claims, 3 Drawing Figures

FUEL ECONOMY INDICATOR HAVING RANGE SELECTED FILTERS

This invention relates to fuel economy indicators. More specifically, this invention relates to a fuel economy indicator which includes a plurality of filters having time constants associated with respective ranges of fuel economy for filtering the instantaneous calculation of fuel economy. The filters are selected as a function of the fuel economy range embracing the instantaneous fuel economy.

Fuel economy indicators are generally known wherein the instantaneous fuel economy is displayed directly to the vehicle operator or is filtered by a single filter having a specified time constant and displayed to the vehicle operator. Although the rapidly changing display of instantaneous fuel economy may be desired at a low range of fuel economy to provide an indication of fuel economy variations resulting from short term variations in vehicle operating parameters, this form of display may not be appropriate at the higher ranges of fuel economy where a filtered, slowly changing display is more desirable. Conversely, a fuel economy indicator wherein the instantaneous fuel economy is filtered by a single filter having a large time constant to provide a slowly changing display may not be appropriate for low ranges of vehicle fuel economy wherein the rapidly changing display of instantaneous fuel economy may be more desirable.

It is the general object of this invention to provide an improved fuel economy indicator.

It is another object of this invention to provide a vehicle fuel economy indicator having a number of filters with respective time constants which are selected as a function of vehicle fuel economy range.

It is another object of this invention to provide a vehicle fuel economy indicator having filters each having a time constant associated with a respective range of fuel economy wherein the filter having the time constant associated with the range of vehicle fuel economy embracing the instantaneous vehicle fuel economy is selected for driving a fuel economy display.

These objects are accomplished in the preferred embodiment by generating a speed signal in response to vehicle speed and a fuel flow signal in response to the vehicle fuel consumption rate. A calculator is responsive to these signals to generate an output which represents the instantaneous vehicle fuel economy. The magnitude of the instantaneous vehicle fuel economy is variable in response to vehicle operating parameters over a specified number of ranges. The output of the calculator representing the instantaneous fuel economy is coupled to a plurality of filters each having a respective time constant associated with a respective one of the ranges over which the instantaneous fuel economy may vary. A filter selector is responsive to the magnitude of the instantaneous value of fuel economy to couple the filter having the time constant associated with the range of fuel economy embracing the instantaneous fuel economy to a display to provide an indication of vehicle fuel economy. In this manner, the time response of the indication of fuel economy to variations in the instantaneous vehicle fuel economy is varied as a function of vehicle fuel economy range.

The invention may be best understood by reference to the following description of a preferred embodiment of the invention and the drawings in which.

Figure 1:
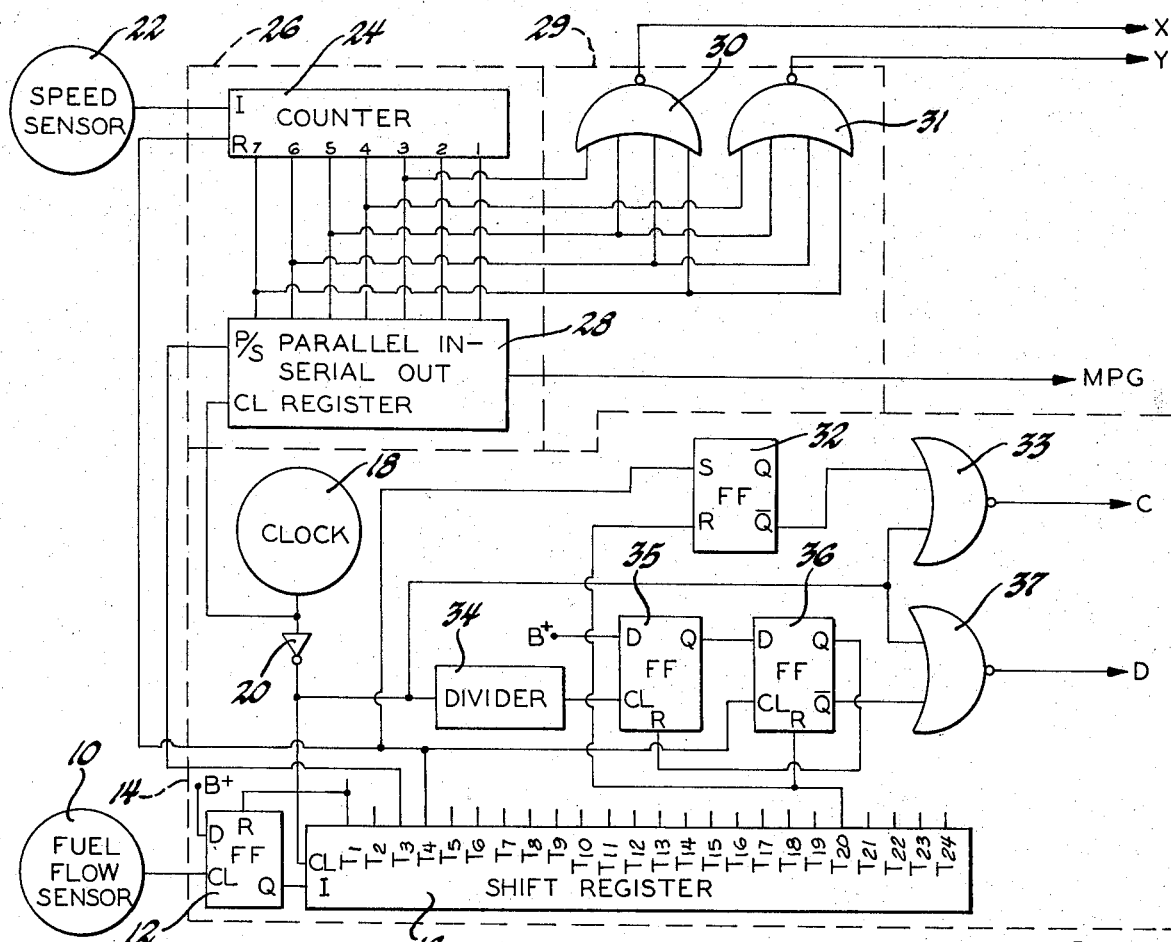
FIG. 1 is a logic diagram illustrating the timing circuit, the fuel economy calculator, and fuel economy range detector of this invention.

Referring to FIG. 1, a fuel flow sensor 10 monitors the fuel flow to a vehicle engine and generates a series of pulses having a repetition rate representing fuel flow rate. Therefore, each pulse represents a specific volume of fuel consumption. The series of pulses from the fuel flow sensor 10 are coupled to the clock input of a flip-flop 12 in a timing circuit 14. A voltage B+ representing a logic 1 level is coupled to the data input of the flip flop 12. The Q output of the flip-flop 12 is coupled to the input of the first stage of a 24-stage shift register 16. The output of the first stage of the shift register 16 is coupled to the reset input of the flip-flop 12.

A clock 18 generates a series of clock pulses having a high repetition rate and which are coupled to the input of an inverter 20. The inverse clock pulses at the output of the inverter 20 are coupled to the clock input of the shift register 16. The repetition rate of the clock pulses from the clock 18 may be, for example, 32 kHz.

The inverse clock pulses from the inverter 20 function to shift the Q output of the flip-flop 12 into and through the shift register 16 in serial fashion. Assuming the Q output of the flip-flop 12 and the outputs of the 24 stages in the shift register 16 are all initially at logic 0, there are no logic changes in response to the inverse clock pulses as only logic 0 levels are shifted into and through the shift register 16.

Upon the occurrence of the leading edge of a pulse output from the fuel flow sensor 10, the Q output of the flip-flop 12 is set to the logic 1 level of the data input. The leading edge of the first inverse clock pulse from the inverter 20 after the flip-flop 12 is set functions to shift the logic 1 at the Q output of the flip-flop 12 into the first stage of the shift register 16. The output of this first stage therefore shifts to a logic 1 which resets the flip-flop 12. Thereafter, in response to and upon the occurrence of the leading edges of repeated inverted clock pulses, the logic 0 at the Q output of the flip-flop 12 is shifted into the shift register 16 and the logic 1 level previously shifted into the first stage is shifted into and out of each stage of the shift register 16 in sequence. In this manner, in response to repeated inverse clock pulses, non-overlapping logic 1 pulses are generated in sequential order at the outputs of the 24 stages of the shift register 16. These logic 1 pulses are hereinafter referred to as timing pulses $T_1$ through $T_{24}$. Upon termination of the last timing pulse $T_{24}$, no timing pulses are generated until the flip-flop 12 is again set by a pulse output of the fuel flow sensor 10 after which the 24 timing pulses $T_1$ through $T_{24}$ are again sequentially generated.

A speed sensor 22 monitors vehicle speed and generates a series of pulses having a repetition rate representing vehicle speed. Therefore, each pulse output of the speed sensor 22 represents a specific distance travelled by the vehicle.

The output of the speed sensor 22 is coupled to the input of a binary counter 24 in a fuel economy calculator 26. The timing pulse $T_4$ from the shift register 16 is coupled to the reset input of the counter 24 which is reset by the leading edge thereof. The counter 24 functions to count in binary fashion the speed pulses generated by the speed sensor 22 between consecutive leading edges of the timing pulse $T_4$. The number of speed pulses counted by the counter 24 is represented in binary form on output lines 1 through 7 ranging from low to high order, respectively.

As the timing pulse $T_4$ from the shift register 16 occurs a set time period after each pulse output of the fuel flow sensor 10, the total pulses counted by the counter 24 is a measure of the total distance travelled by the vehicle while consuming the specific volume of fuel represented by each pulse output of the fuel flow sensor 10. By selecting the speed sensor 22 so that each pulse represents a certain fraction of a mile and by selecting the fuel flow sensor 10 so that each pulse represents the same fraction of a gallon, the total number of speed pulses counted by the counter 24 is a direct representation of fuel economy in miles per gallon.

The output of each stage of the counter 24 is coupled to respective parallel inputs of a parallel in-serial out register 28. The timing pulse $T_3$ from the shift register 16 is coupled to the parallel serial control input of the register 28 and the clock pulses from the clock 18 are coupled to the clock input of the register 28. The timing pulse $T_3$ functions to set the register 28 to its parallel entry mode to shift the binary number in the counter 24 into the register 28. Upon termination of the timing pulse $T_3$, the register 28 is set to its serial output mode and the clock pulses function to shift the contents of the register 28 in serial fashion to its output.

At the occurrence of the leading edge of timing pulse $T_3$, the output of the binary counter 24 representing the instantaneous vehicle fuel economy in miles per gallon is entered into the register 28. Upon termination of the timing pulse $T_3$, the timing pulse $T_4$ is initiated which functions to reset the counter 24. The counter 24 then proceeds again to count speed pulses. Upon the occurrence of the next timing pulse $T_3$, an updated calculation of fuel economy is again shifted into the register 28.

Upon termination of the timing pulse $T_3$, the register 28 is set to its serial output mode and the clock pulses from the clock 18 function to shift the binary number therein which represents the instantaneous vehicle economy in miles per gallon to its output in serial fashion with the least significant binary bits being shifted out first. This output, representing the most recent calculation of fuel economy in miles per gallon, will hereinafter be referred to as MPG.

An economy range detector 29 includes a NOR gate 30 and a NOR gate 31. The binary outputs of the counter 24 representing numerals 4, 16, 32 and 64 are coupled to respective inputs of the NOR gate 30 and the binary outputs of the counter 24 representing numerals 8, 16, 32 and 64 are coupled to respective inputs of the NOR gate 31. Upon the initiation of the timing pulse $T_3$, the outputs of the NOR gates 30 and 31 are signals X and Y, respectively, whose logic states are a coded representation of the fuel economy range which embraces the instantaneous fuel economy as represented by the output of the counter 24. For example, when the fuel economy is between 0 and 3 miles per gallon inclusive, the outputs X and Y of the NOR gates 30 and 31 are both at a logic 1. When the fuel economy is within the range of 4 to 7 miles per gallon inclusive, the output X of the NOR gate 30 is a logic 0 and the output Y of the NOR gate 31 is a logic 1. When the fuel economy range is between 8 and 11 miles per gallon inclusive, the output X of the NOR gate 30 is logic 1 and the output Y of the NOR gate 31 is a logic 0. When the fuel economy is in a range of 12 or greater miles per gallon, the outputs X and Y of the NOR gates 30 and 31 are both logic 0's.

The timing circuit 14 includes a flip-flop 32 whose $\overline{Q}$ output is coupled to one input of a NOR gate 33. The timing pulse $T_4$ from the shift register 16 is coupled to the set input of the flip-flop 32 and the timing pulse $T_{20}$ from the shift register 16 is coupled to the reset input of the flip-flop 32. The inverse clock pulses from the inverter 20 are coupled to a second input of the NOR gate 33.

The flip-flop 32 and the NOR gate 33 function to supply a series of 16 pulses coinciding with the first 16 clock pulses from the clock 18 which occur after the register 28 is set to its serial output mode. Consequently, these pulses are synchronized with the serial output of the register 28 representing instantaneous fuel economy. The output of the NOR gate 33 will hereinafter be referred to as pulse series C.

The timing circuit 14 further includes a divider 34 whose output is coupled to the clock input of a flip-flop 35. A source of voltage B+ representing a logic 1 level is coupled to the data input of the flip-flop 35 and the Q output of the flip-flop 35 is coupled to the data input of a flip-flop 36. The Q output of the flip-flop 36 is coupled to the reset input of the flip-flop 35 and its $\overline{Q}$ output is coupled to one input of a NOR gate 37. The timing pulse $T_4$ is coupled to the clock input of the flip-flop 36 and the timing pulse $T_{20}$ is coupled to the reset input of the flip-flop 36. The inverse clock pulses from the inverter 20 are coupled to a second input of the NOR gate 37. The flip-flops 35 and 36 are each of the type wherein the Q output is shifted to the logic level of the data input at the leading edge of a logic 1 pulse applied to the clock input.

The divider 34 generates a logic 1 pulse having a specified repetition rate. Upon the occurrence of the leading edge of the logic 1 pulse from the divider 34, the Q output of the flip-flop 35 is shifted to the logic 1 level of the data input thereof. Thereafter, upon the generation of the timing pulse $T_4$, the Q output of the flip-flop 36 is shifted to the logic 1 level at its data input to reset the flip-flop 35 and its $\overline{Q}$ output is shifted to a logic 0. The timing pulse $T_{20}$ resets the flip-flop 36. During the time period that the $\overline{Q}$ output of the flip-flop 36 is a logic 0, the NOR gate 37 supplies a series of 16 pulses coinciding with the 16 pulses supplied by the NOR gate 33. The output of the NOR gate 37 will hereinafter be referred to as pulse series D. The foregoing cycle is again repeated when the output of the divider 34 again shifts to a logic 1. The duration between each series of 16 pulses from the NOR gate 37 is determined by the stages within the divider 34 and may be made to equal any time duration desired.

As opposed to the NOR gate 33 which supplies the series of 16 pulses after each timing pulse $T_4$, the NOR gate 37 supplies a series of 16 pulses coinciding therewith only after the flip-flop 35 has been clocked by the divider 34.

Figure 2:
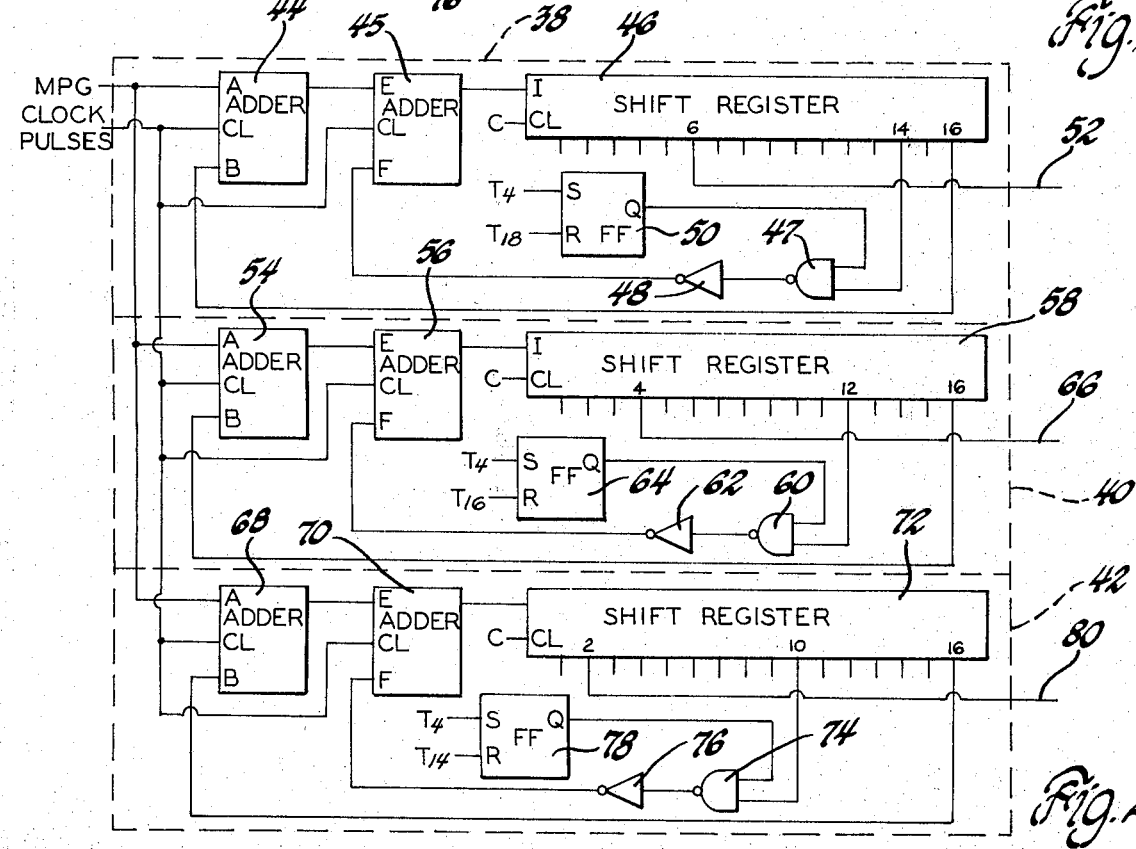
FIG. 2 is a logic diagram of three digital filters each having a respective time constant associated with a specific range of vehicle fuel economy.

The binary representation of instantaneous vehicle fuel economy in miles per gallon which is serially shifted from the register 28 may vary widely as a function of vehicle operation. For example, a vehicle under heavy acceleration and/or under heavy load may result in very low economy in terms of miles per gallon whereas a vehicle under steady speed conditions with a light load may have much greater fuel economy. As seen in FIG. 2, three digital filters 38, 40 and 42 illustrated each having a time constant which is associated with a specific range of fuel economy. For example, the filter 38 has a short time constant which may be associated, for example, with vehicle fuel economy in the range of 0 through 3 miles per gallon, the filter 40 has a larger time constant associated with a fuel economy range of 4 through 7 miles per gallon and the filter 42 has a yet larger time constant associated with a range of fuel economy of 8 miles per gallon or greater.

The filter 38 includes a binary adder 44 having data inputs A and B and a clock input. The binary adder 44 is responsive to binary numbers supplied in serial form to the inputs A and B synchronized with clock pulses supplied to its clock input to supply a serial binary number at its output which represents the quantity $-(A + B)$. The filter 38 includes a second binary adder 45 which is identical to the binary adder 44 and which has data inputs E and F. The binary adder 45 is responsive to binary numbers supplied in serial form at its inputs E and F synchronized with clock pulses supplied to its clock input to supply a serial binary number which represents the quantity $-(E + F)$. The output of the adder 44 is coupled to the E input of the adder 45 so that the output of the adder 45 is equal to $-(-A-B + F)$. The output of the binary adder 45 is coupled to the input of a 16 stage shift register 46. Binary data supplied to the input of the shift register 46 is shifted into and through the shift register 46 in response to clock pulses supplied to its clock input.

The instantaneous fuel economy MPG from the register 28 of FIG. 1 is coupled to the A input of the binary adder 44 and the clock pulses from the clock 18 of FIG. 1 are coupled to the clock inputs of the binary adders 44 and 45. The pulse series C at the output of the NOR gate 34 of FIG. 1 are coupled to the clock input of the shift register 46. The output of the last stage of the shift register 46 is coupled to the B input of the binary adder 44 and the output of the fourteenth stage is coupled to an input of a NAND gate 47 whose output is coupled to the F input of the adder 45 through an inverter 48. The Q output of a flip-flop 500 is coupled to a second input of the NAND gate 47. The timing pulse $T_4$ from the shift register 16 is coupled to the set input of the flip-flop 50 and the timing pulse $T_{18}$ is coupled to the reset input of the flip-flop 50.

Upon termination of the timing pulse $T_3$, the clock pulses from the clock 18 shifts the binary representation of the instantaneous fuel economy in the register 18, serially to the binary adder 44. Simultaneously and in synchronism therewith, the clock pulses clock the adders 44 and 45 and the 16 pulses in the pulse series C from the NOR gate 32 clock the shift register 46. The 16 bits previously stored in the shift register 46 prior to the pulses in the pulse series C, representing a binary number hereinafter referred to as $Z_{OLD}$, are shifted through the stages in the shift register 46 and out of its last stage to the B input of the adder 44 and the binary member from the output of the adder 45, hereinafter referred to as $Z_{NEW}$ is serially shifted into the shift register 45. $Z_{NEW}$ then becomes $Z_{OLD}$ and the cycle is repeated upon the termination of the next timing pulse $T_3$.

When $Z_{OLD}$ is being shifted through the shift register 14, the 14 most significant bits of the binary number which represents $Z_{OLD}$ is coupled to the F input of the binary adder 45 by the enabling of the NAND gate 47 by the Q output of the flip-flop 50 during the first 14 pulses in the pulse series C. This is accomplished by the setting of the flip-flop 50 by the timing pulse $T_4$ and the resetting thereof by the timing pulse $I_{18}$ which again disables the NAND gate 47. Disabling the NAND gate 47 by the timing pulse $T_{18}$ functions to block the first two least significant bits of $Z_{NEW}$ being shifted into the register 46. By coupling only the 14 most significant bits of $Z_{OLD}$ to the inverter 48 during the first 14 pulses in the pulse series C and eliminating the two least significant bits, the output of the inverter 48 coupled to the F input of the adder 45 is a binary number in serial form which represents the whole number portion of the quantity $(Z_{OLD}/2^2)$.

In terms of the binary numbers indicated, the output of the adder 44 is the quantity $-(\text{MPG} + Z_{OLD})$ and the output of the binary adder 45 representing $Z_{NEW}$ is equal to the quantity $-[-\text{MPG} - Z_{OLD} + (Z_{OLD}/2^2)]$. The binary number $Z_{NEW}$ in the register 46 is a filtered representation of fuel economy in miles per gallon times the quantity $(2^2)$. The output of the filter 38 is taken at the output of the sixth stage of the shift register 46 which is supplied to an output line 52.

The time constant of the filter 38 is determined by the magnitude of the number by which $Z_{OLD}$ is divided and supplied to the F input of the adder 45. For example, if the output of the sixteenth stage of the shift register 46 were coupled to the F input of the binary adder 45, $Z_{NEW}$ would be equal to the instantaneous calculation of fuel economy supplied to the binary adder 44 from the register 28 of FIG. 1. By increasing the magnitude of the number by which $Z_{OLD}$ is divided and supplied to the F input of the binary adder 45, the time constant of the filter 38 is increased. The time constant of the filter 38 is selected so as to be relatively short to provide a rapidly changing indication of vehicle fuel economy when the fuel economy is in a low range such as from 1 through 3 miles per gallon.

The filter 40 is comprised of a binary adder 54 having data inputs A and B and a binary adder 56 having data inputs E and F. The output MPG of the register 28 of FIG. 1 is coupled to the A input of the adder 54 whose output is coupled to the E input of the adder 56. Clock pulses from the clock 18 are coupled to the clock inputs of the adders 54 and 56. The output of the adder 56 is coupled to the data input of a 16-stage shift register 58 identical to the shift register 46 in the filter 38. The last stage of the shift register 58 is coupled to the B input of the adder 54 and the output of the twelfth stage is coupled to one input of a NAND gate 60 whose output is coupled to the F input of the binary adder 56 through an inverter 62. A flip-flop 64 has its Q output coupled to a second input of the NAND gate 60. The timing pulse $T_4$ is coupled to the set input of the flip-flop 64 and the timing pulse $T_{16}$ is coupled to the reset input thereof. The pulse series C from the NOR gate 33 of FIG. 1 is coupled to the clock input of the shift register 58. The output of the filter 40 is taken from the output of the fourth stage of the shift register 58 on line 66.

The operation of the filter 40 is identical to the operation of the filter 38 but with a larger time constant by nature of the coupling of the twelfth stage of the shift register 58 to the NAND gate 60. The resulting binary number coupled in serial form to the F input of the adder 56 represents the whole number portion of the quantity $(Z_{OLD}/2^4)$. $Z_{NEW}$ shifted into the register 40 from the adder 56 is a filtered representation of fuel economy in miles per gallon times the quantity ($2^4$). The time constant of the filter 40 is associated with a vehicle fuel economy range of, for example, 4 through 7 miles per gallon.

The filter 42 includes a binary adder 68 having data inputs A and B and a binary adder having data inputs E and F. The output MPG of the shift register 28 of FIG. 1 is coupled to the A input of the adder 68 whose output is coupled to the E input of the adder 70. The clock pulses from the clock 18 are coupled to the clock inputs of the adders 68 and 70. The output of the adder 70 is coupled to the data input of a 16-stage shift register 72 identical to the shift register 46. The pulse series C from the NOR gate 33 are coupled to the clock input of the shift register 72. The last stage of the shift register 72 is coupled to the B input of the binary adder 68 and the output of the tenth stage of the shift register 72 is coupled to an input of a NAND gate 74 whose output is coupled to the F input of the binary adder 70 through an inverter 76. A flip-flop 78 has its Q output coupled to a second input of the NAND gate 74. The timing pulse $T_4$ is coupled to the set input of the flip-flop 78 and the timing pulse $T_{14}$ is coupled to the reset thereof. The output of the filter 42 is taken from the output of the second stage of the shift register on line 80.

The operation of the filter 42 is identical to the operation of the filters 38 and 40 but with a larger time constant by nature of the coupling of the tenth stage of the shift register 72 to the NAND gate 74. The resulting binary number coupled in serial form to the F input of the adder 70 represents the whole number portion of the quantity ($Z_{OLD}/2^6$). $Z_{NEW}$ shifted into the register 72 from the adder 70 is a filtered representation of fuel economy in miles per gallon times the quantity ($2^6$). The time constant of the filter 42 is associated with a fuel economy range of, for example, 8 miles per gallon and above.

Figure 3:
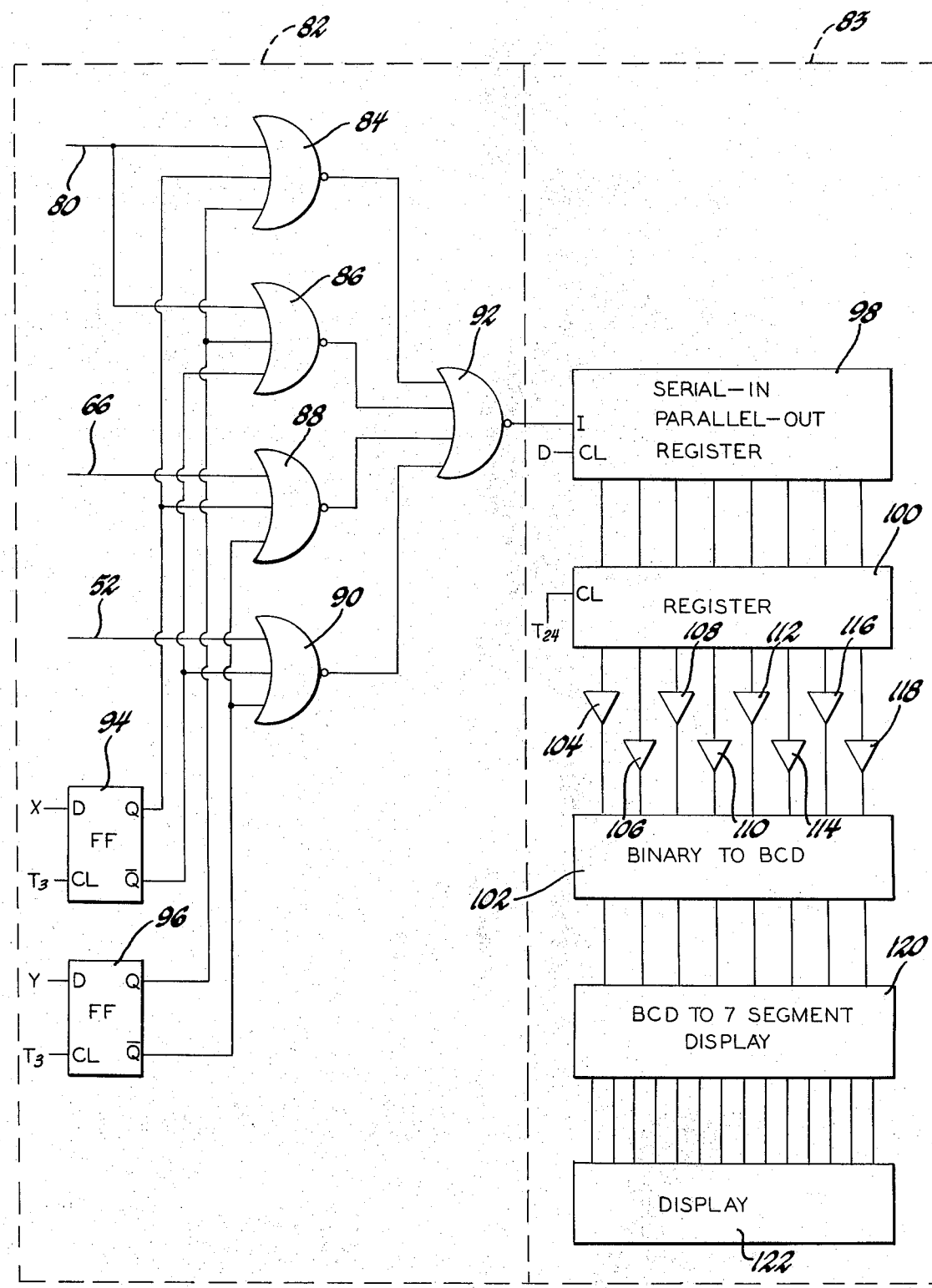
FIG. 3 is a schematic diagram of a filter selector and display system for providing an indication of vehicle fuel economy.

Referring to FIG. 3, a filter selector 82 is responsive to the logic states of the X and Y signals from the economy range detector 29 of FIG. 1 to couple the output of the filter 38, 40 or 42 of FIG. 2 associated with the range of fuel economy embracing the instantaneous fuel economy to a display circuit 83.

The filter selector 82 includes NOR gates 84, 86, 88 and 90 whose outputs are coupled to respective inputs of a NOR gate 92. The output of the filter 38 on line 52 is coupled to one input of the NOR gate 90, the output of the filter 40 on line 66 is coupled to one input of the NOR gate 88 and the output of the filter 42 on the line 80 is coupled to one input of each of the NOR gates 84 and 86.

The X output of the economy range detector 29 is coupled to the data input of a flip-flop 94 and the Y output is coupled to the data input of a flip-flop 96. The timing pulse $T_3$ is coupled to the clock input of each of the flip-flops 94 and 96. The Q output of the flip-flop 94 is coupled to an input of each of the NOR gates 84 and 88 and the $\overline{Q}$ output thereof is coupled to an input of each of the NOR gates 86 and 90. The Q output of the flip-flop 96 is coupled to an input of the NOR gates 84 and 86 and the $\overline{Q}$ output thereof is coupled to an input of each of the NOR gates 88 and 90.

At the leading edge of the timing pulse $T_3$, the Q outputs of the flip-flops 94 and 96 assume the state of the X and Y signals respectively which is a coded representation of vehicle fuel economy range.

In the specific embodiment, the outputs of the flip-flops 94 and 96 enable the NOR gate 90 to couple the output of the filter 38 to the display circuit 83 through the NOR gate 92 and cause the NOR gates 84, 86 and 88 to block the outputs of the filters 40 and 42 when the instantaneous fuel economy is in the range of 0 through 3 miles per gallon, enable the NOR gate 88 to couple the output of the filter 40 to the display circuit 83 through the NOR gate 92 and cause the NOR gates 84, 86 and 90 to block the outputs of the filters 38 and 42 when the instantaneous fuel economy is in the range of 4 through 7 miles per gallon, enable the NOR gate 86 to couple the output of the filter 42 to the display circuit 83 through the NOR gate 92 and cause the NOR gates 84, 88 and 90 to block the outputs of the filters 38 and 40 when the instantaneous fuel economy is in the range of 8 through 11 miles per gallon, and enable the NOR gate 84 to couple the output of the filter 42 to the display circuit 83 through the NOR gate 92 and cause the NOR gates 86, 88 and 90 to block the outputs of the filters 38 and 40 when the instantaneous fuel economy is in the range of 12 and greater miles per gallon.

The output of the NOR gate 92 is the filtered representation of fuel economy in serial form from the output of the filters 38, 40 or 42 selected by the filter selector 82. This output is coupled to the input of an 8-stage serial-in/parallel-out register 98. The clock pulse series D from the NOR gate 37 of FIG. 1 is coupled to the clock input of the register 98. The output of the NOR gate 92 is shifted into the register 98 by the clock pulses in the pulse series D. By the use of an 8-stage register and by taking the output of the filter 38 from the sixth stage of the shift register 46, the binary number shifted into the register 98 when the NOR gate 90 is enabled is divided by the quantity ($2^2$) to obtain a binary number representing fuel economy in miles per gallon. Conversely, by taking the output of the filter 40 at the fourth stage of the shift register 58, the binary number shifted into the register 98 when the NOR gate 88 is enabled is divided by the quantity ($2^4$) and by taking the output of the filter 42 at the second stage of the shift register 72, the binary number shifted into the register 98 when either of the NOR gates 84 or 86 is enabled is divided by quantity ($2^6$). In this manner, the binary number shifted into the register 98 is exactly equal to the filtered fuel economy in miles per gallon.

The parallel outputs of the register 98 are coupled to the inputs of an 8-stage parallel-in/parallel-out register 100. The timing pulse $T_{24}$ is coupled to the clock input of the register 100 and upon the leading edge thereof causes the output of the register 98 to be shifted into the register 100. In this manner, the filtered representation of fuel economy is stored to prevent a change in the fuel economy display while a new filtered representation of fuel economy is being shifted into the register 98. The output of each stage in the register 100 is coupled to the parallel inputs of a binary to BCD converter 102 through respective buffer amplifiers 104 through 118. The output of the binary to BCD converter 102 is coupled to a BCD to seven segment display converter 120 whose outputs drive a digital display 122 positioned in the vehicle so as to provide an indication of fuel economy to the vehicle operator.

As can be seen, the output of the NOR gate 92 is shifted into the register 98 only when the clock pulse series D is generated by the NOR gate 37 of FIG. 1. In this manner, the time period at which the output of the display 122 is updated is less than the time period of each calculation of vehicle fuel economy. The time period for updating the display 122 may be varied as desired by the insertion or deletion of stages in the divider 34 of FIG. 1.

Although the foregoing description of a preferred embodiment describes a digital fuel economy calculator, the calculator could take the form, for example, of an analog circuit as will be apparent by those skilled in the art. In addition, other modifications may be made by the exercise of skill in the art without departing from the scope of the invention.

I claim:

1. A vehicle fuel economy indicator having range selected filters comprising: means for generating a signal representing vehicle speed; means for generating a fuel consumption signal representing vehicle fuel consumption; means responsive to the speed signal and the fuel consumption signal for generating a fuel economy signal representing the instantaneous vehicle fuel economy, the instantaneous vehicle fuel economy being variable over a specified number of ranges in response to vehicle operating parameter variations; a plurality of signal filters, each signal filter having a respective time constant associated with a respective one of the ranges of vehicle fuel economy; means for coupling the fuel economy signal to each of the signal filters, each of the signal filters supplying an output signal whose time response to variations in the instantaneous vehicle fuel economy is determined by the time constant of said signal filter; indicating means; and gate means responsive to the fuel economy signal for coupling the output signal from the signal filter having the time constant associated with the range of fuel economy embracing the instantaneous fuel economy to the indicating means, the indicating means being responsive to the output of the signal filter coupled thereto for providing an indication of vehicle fuel economy, whereby the time response of the indication of vehicle fuel economy to variations in the instantaneous vehicle fuel economy is varied as a function of vehicle fuel economy range.

2. A vehicle fuel economy indicator having range selected filters comprising: means for generating a series of speed pulses having a repetition rate directly proportional to vehicle speed, means for generating a series of fuel consumption pulses having a repetition rate directly proportional to vehicle fuel consumption rate; a digital counter responsive to the speed and fuel consumption pulses for repeatedly counting the speed pulses for a time duration equal to the time between two consecutive fuel consumption pulses to provide repeated digital representations of the instantaneous vehicle fuel economy, the instantaneous vehicle fuel economy being variable over a specified number of ranges in response to vehicle operating parameter variations; means coupled to the digital counter for generating a coded digital representation of the fuel economy range within the specified number of ranges which embraces the instantaneous vehicle fuel economy; a plurality of digital filters, each digital filter having a respective time constant associated with a respective one of the ranges of vehicle fuel economy; means for coupling the repeated digital representations of the instantaneous vehicle fuel economy to each of the digital filters, each of the digital filters supplying a digital output representing a filtered vehicle fuel economy whose time response to variations in the instantaneous fuel economy is determined by the time constant of said digital filter; a digital indicating means; and logic gate means responsive to the coded digital representation of the fuel economy range for coupling the output of the digital filter having the time constant associated with the range of fuel economy embracing the instantaneous fuel economy to the digital indicating means, the indicating means being responsive to the output of the digital filter coupled thereto for providing an indication of vehicle fuel economy, whereby the time response of the indication of vehicle fuel economy to variations in the instantaneous vehicle fuel economy is varied as a function of vehicle fuel economy range.

* * * * *